(12) United States Patent
Heider

(10) Patent No.: US 6,543,321 B1
(45) Date of Patent: Apr. 8, 2003

(54) UPSTREAM GUIDE FOR PEELING MACHINE

(75) Inventor: Friedrich Heider, Solingen (DE)

(73) Assignee: SMS Eumuco GmbH, Leverkusen (DE)

( * ) Notice: Subject to any disclaimer, the term of this patent is extended or adjusted under 35 U.S.C. 154(b) by 161 days.

(21) Appl. No.: 09/709,745

(22) Filed: Nov. 9, 2000

(30) Foreign Application Priority Data

Nov. 11, 1999 (DE) .......................... 199 54 117

(51) Int. Cl.⁷ .......................... B23B 15/00; B23B 25/00
(52) U.S. Cl. ................. 82/163; 82/164; 82/9.3
(58) Field of Search .......................... 82/163, 162, 164, 82/131, 136, 137, 138, 141, 903

(56) References Cited

U.S. PATENT DOCUMENTS

| | | | | |
|---|---|---|---|---|
| 5,113,730 A | * | 5/1992 | Ducanis .......................... | 82/152 |
| 5,255,581 A | * | 10/1993 | Glomb et al. .............. | 29/81.11 |
| 5,277,090 A | * | 1/1994 | Shintani et al. ................ | 82/112 |
| 5,303,621 A | * | 4/1994 | Horlitz et al. .............. | 226/176 |

FOREIGN PATENT DOCUMENTS

| | | | |
|---|---|---|---|
| DE | 1074360 | | 1/1960 |
| DE | 4122948 | | 1/1993 |
| EP | 0 462 322 | | 12/1994 |
| JP | 5-111807 | * | 5/1993 |

\* cited by examiner

*Primary Examiner*—Henry Tsai
(74) *Attorney, Agent, or Firm*—Herbert Dubno; Andrew Wilford

(57) ABSTRACT

A peeling machine through which a rod workpiece is moved along a main axis has an upstream guide and a downstream guide centering the workpiece on the axis and axially flanking a rotary scraper engaging the workpiece. The upstream guide has a plurality of supports angularly spaced about the axis and respective holders displaceable in the supports along respective holder axes extending radially of the axis and having respective centering elements engaging the workpiece radially of the main axis. Respective biasing units braced between the holders and the supports elastically press the elements against the workpiece radially of the main axis Respective brake elements in the supports engage radially of the holder axes against the holders and are pressed radially of the holder axes against the holders so as to rub on the holders and damp vibration in the workpiece.

6 Claims, 3 Drawing Sheets

UPSTREAM GUIDE FOR PEELING MACHINE

FIELD OF THE INVENTION

The present invention relates to a peeling machine. More particularly this invention concerns an upstream guide of such a machine.

As described in European patent document 0,462,322 of Glomb et al, a peeling machine for stripping mill scale and the like from a rod which may be tubular comprises an upstream guide, a central rotary scraper, a downstream guide, and a feeder for advancing the rod along its axis through the guides and scraper. The upstream feeder comprises a plurality of rollers bearing radially upstream of the scraper against the unscraped workpiece, and the downstream feeder can comprise another such array of rollers or slide blocks bearing radially against the scraped workpiece downstream of the scraper. The feeder has a plurality of jaws or rollers that are normally located downstream of the downstream guide and that pull the rod through the machine. The scraper itself comprises at least one scraping tool that is orbited about the axis between the two guides so as to cut an outer layer off the rod workpiece.

The guides need to hold the workpiece as steady as possible which is a fairly difficult task as it is moving longitudinally while being engaged forcefully in a radial direction by the tool or tools of the rotary scraper head. In particular the rapidly rotating scraper must not set the workpiece vibrating such that the tools dig excessively into it. The guides must damp this vibration as much as possible.

The standard biasing system for the upstream guide rollers is typically a respective pack of spring washers braced between each roller mount and a respective radially extending spindle threaded into a fixed support. Thus to increase the damping effect the spindle is advanced to compress the spring pack more, and to decrease it the spindle is retracted. Since the workpiece is relatively incompressible, such screwing-in or screwing-out of the spindle does not perceptibly move the respective roller appreciably, but changes the extent of compression of its biasing spring pack. Such systems often let the workpiece vibrate, a standing wave being created in it that is a function of the extent of compression of the spring packs, the rotation rate of the scraper head, the longitudinal displacement speed of the workpiece, the workpiece composition, and other minor factors.

OBJECTS OF THE INVENTION

It in therefore an object of the present invention to provide an improved upstream guide for a rod-peeling machine.

Another object is the provision of such an improved upstream guide for a rod-peeling machine which overcomes the above-given disadvantages, that is which substantially eliminates vibration in the rod so that the scraper can cut the rod to a perfectly cylindrical shape.

SUMMARY OF THE INVENTION

A peeling machine through which a rod workpiece is moved along a main axis has an upstream guide and a downstream guide centering the workpiece on the axis and axially flanking a rotary scraper engaging the workpiece. The upstream guide has according to the invention a plurality of supports angularly spaced about the axis and respective holders displaceable in the supports along respective holder axes extending radially of the axis and having respective centering elements engaging the workpiece radially of the main axis. Respective biasing units braced between the holders and the supports elastically press the elements against the workpiece radially of the main axis. Respective brake elements in the supports engage radially of the holder axes against the holders and are pressed radially of the holder axes against the holders so as to rub on the holders and damp vibration in the workpiece.

This system serves to damp even minor radial displacements of be workpiece so that the scraper will not dig into it, Whereas the prior-art system often allows the workpiece to move radially to a small extent, the system of this invention suppresses even these minor movements.

The brake elements according to the invention are formed as pistons and the means for pressing includes a source of hydraulic pressure operable against the pistons. The centering elements are rollers. The hydraulic-pressure source applies the same pressure to all of the pistons. The pistons are of a wear-resistant material such as bronze or red brass and have inner ends that are complementary to the outside shape of the holder. With a cylindrical sleeve-shaped holder the pistons engage over about 120° of the holder in good surface-to-surface contact.

The biasing unit in accordance with the invention includes respective springs braced axially of the holder axes against the holders,

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
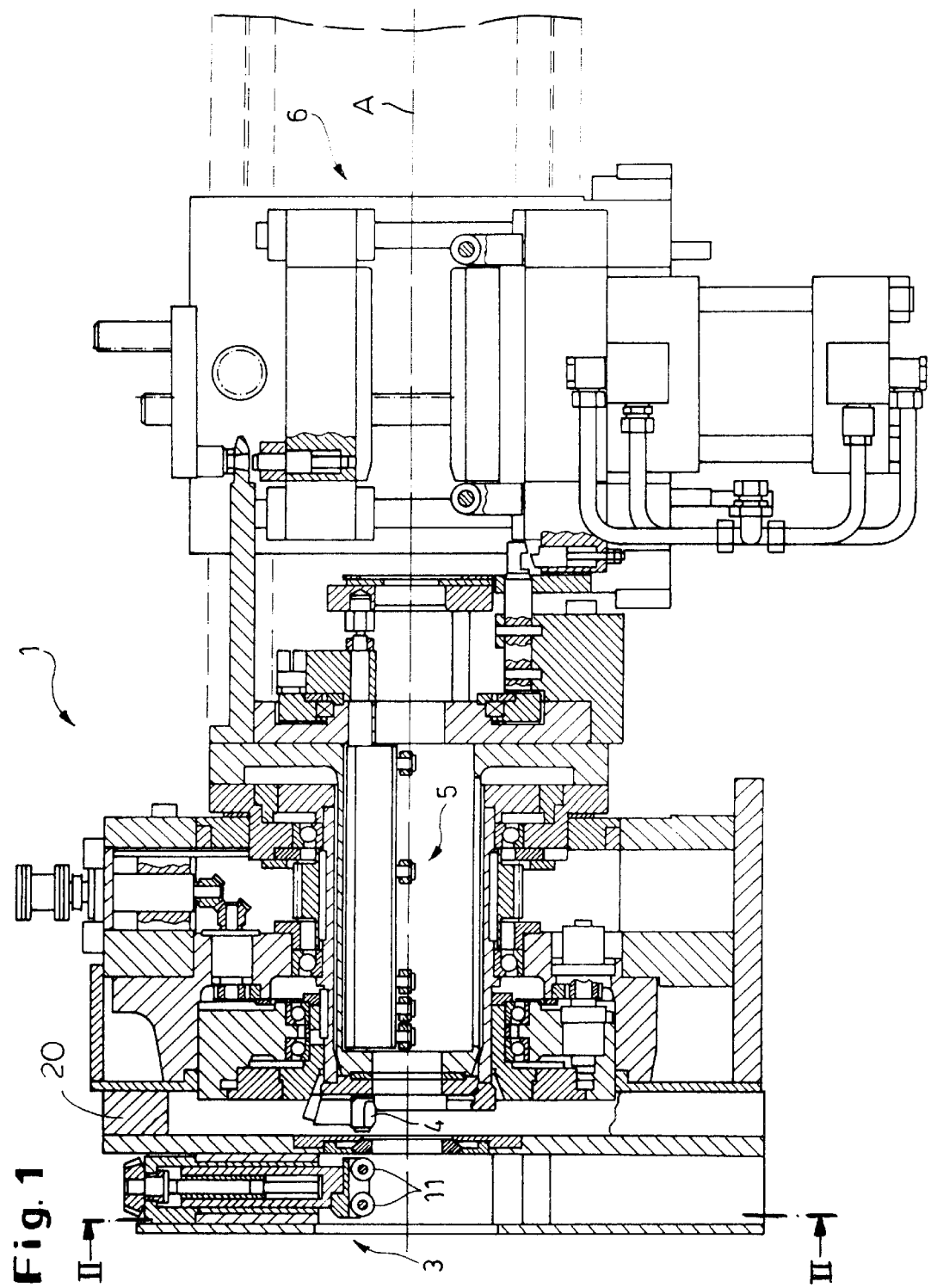
FIG. 1 is an axial section through a rod-peeling machine according to the invention.

As seen in FIG. 1 a peeling machine 1 for a large-diameter rod workpiece 2a (up in FIG. 2) or a small-diameter workpiece 2b (down in FIG. 2, FIG. 3) basically comprises an upstream guide 3, a scraper 4, a downstream guide 5, and a longitudinal step-type feeder 6. The workpiece 2a or 2b advances along an axis A through the machine 1 while as is standard the scraper 4 orbits about this axis A and removes an outer layer from the workpiece 2a or 2b.

Figure 2:
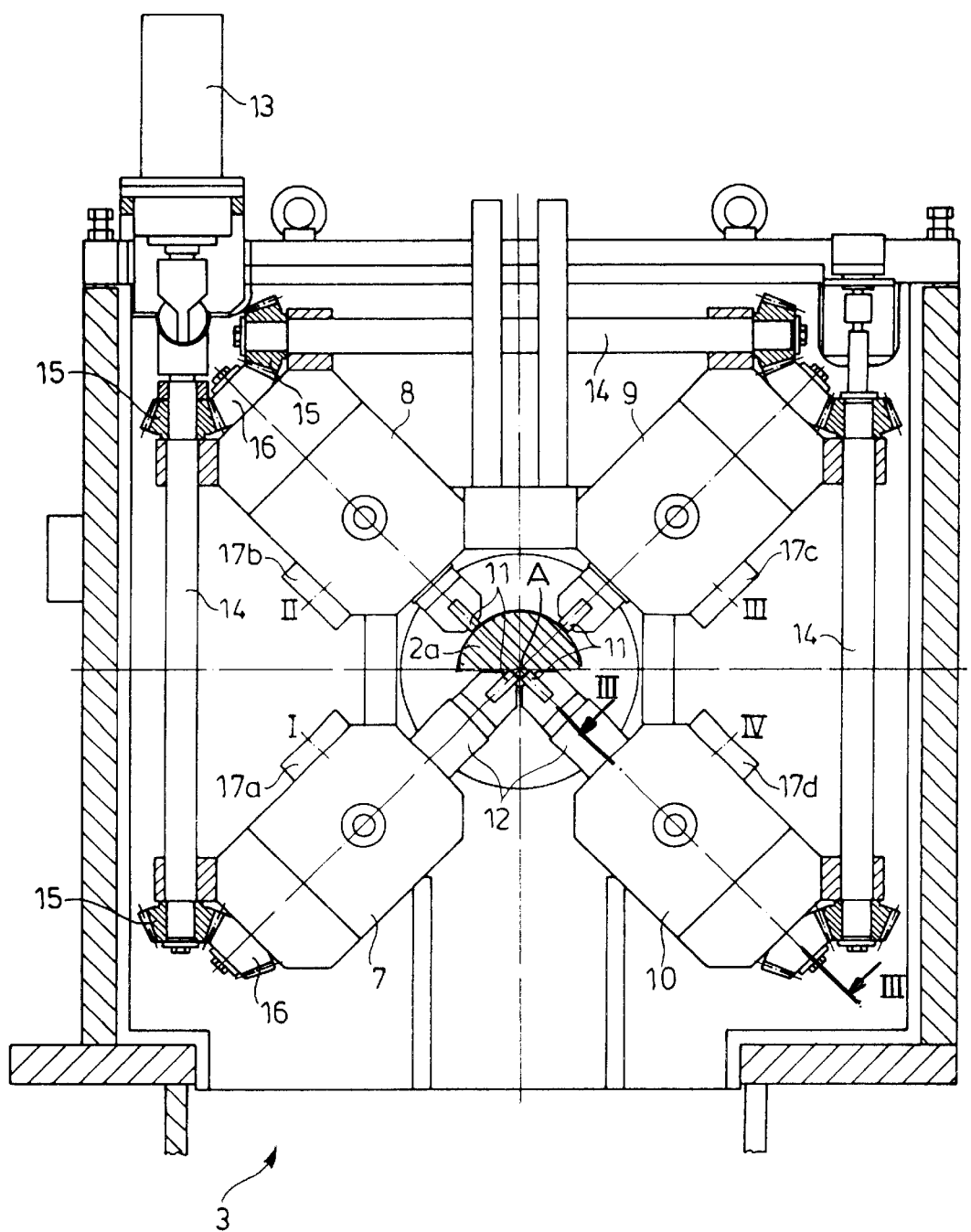
FIG. 2 is a cross section taken along line II—II of FIG. 1.
Figure 3:
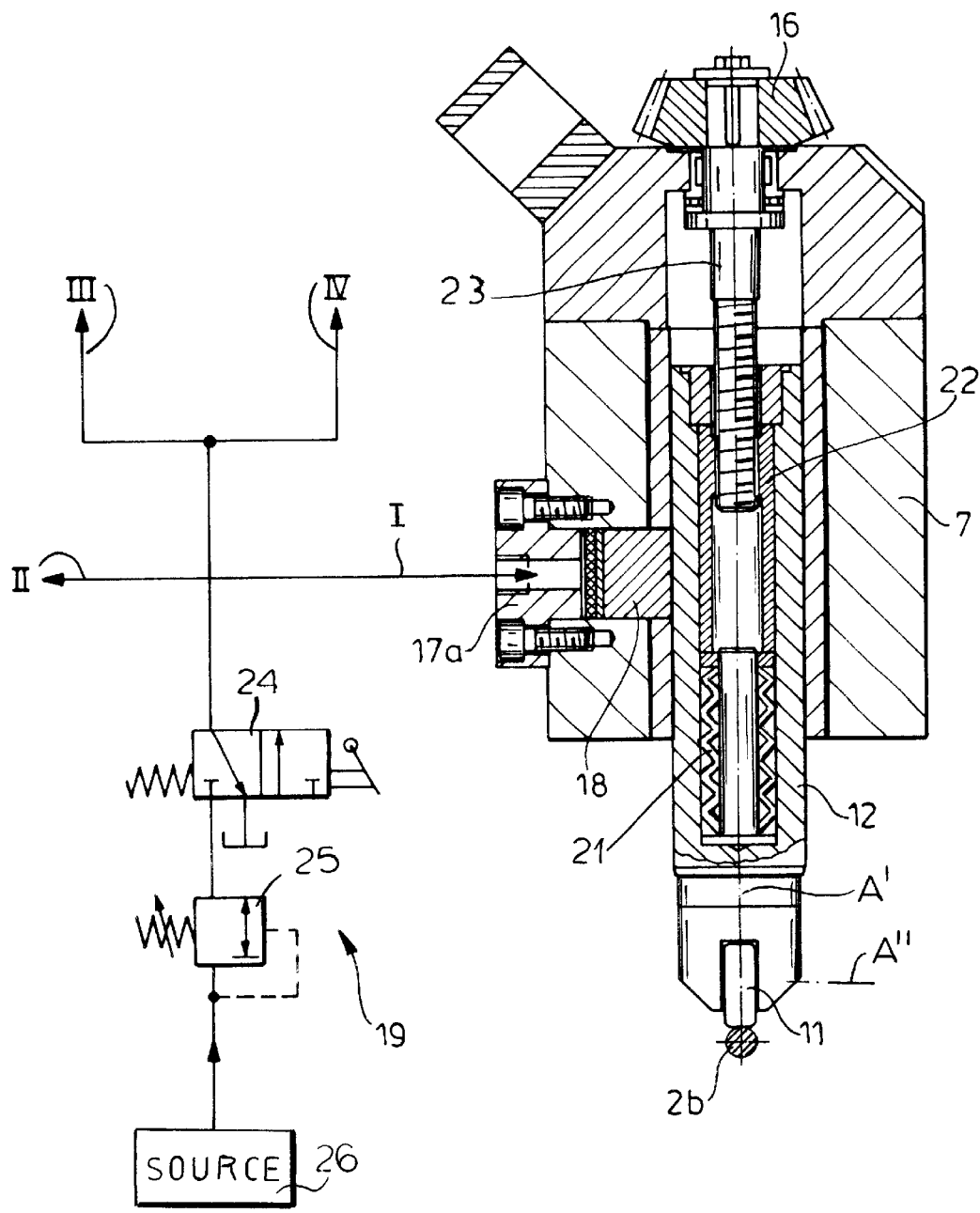
FIG. 3 is a partly diagrammatic section taken along line III—III of FIG. 2.

As best shown in FIGS. 2 and 3 the upstream guide 3 according to the invention comprises four supports 7, 8, 9, and 10 angularly equispaced about the axis A, fired to a housing 20 of the machine 1, and each receiving a cylindrically tubular holder slide 12 displaceable along a respective axis A' extending radially of the axis A and carrying a respective roller 11 rotatable about an axis A" perpendicular to the was A'. The axes A' and A" all lie in a common plane perpendicular to the axis A.

Each slide 12 is braced as shown in FIG. 3 by a spring pack 21 against a nut sleeve 22 threaded on the inner end of a spindle 23 rotatable about the respective axis A' and carrying a bevel gear 16 so that the slides 12 can be advanced and retracted in the respective holders 7–10 by the spindles 23 but still can move limitedly along the respective axes A' relative to the respective spindles 23 by compression and decompression of their spring packs 21. Rods 14 carry gears 15 meshing with the gears 16 and are rotated jointly by a motor 13 to displace all the slides 7–10 radially synchronously.

According to the invention each of the slides 12 is associated with a respective hydraulic biasing unit 17*a*, 17*b*, 17*c*, or 17*d* that has a bronze or red-brass piston 18 with a part-cylindrical concave end bearing on the respective slide 12. The pistons 18 are movable radially of the respective axis A' in the respective holders 7–10. These units 17*a*–17*d* (only one of which is shown in detail in FIG. 3) are connected to respective hydraulic lines I, II, III, and IV that are all jointly fed hydraulic pressure from a feed system comprising a three-port two-position slide valve 24, an adjustable pressure-regulating valve 25, and a source 26 of pressurized hydraulic fluid.

Thus in addition to the adjustable elastic biasing force exerted by the spring pack 21, the slides 12 are also subjected to the damping action of the pistons 18 that rub against them. The result is that vibration is effectively suppressed and the rod workpiece 2*a* or 2*b*, even though it is being stepped longitudinally by the feeder 6 and engaged radially by the orbiting scraper 4, will not vibrate appreciably.

I claim:

1. An upstream guide for a peeling machine through which a rod workpiece is moved along a main axis and having the upstream guide and a downstream guide centering the workpiece on the axis and axially flanking a rotary scraper engaging the workpiece, the upstream guide comprising:

a plurality of supports angularly spaced about the axis;

respective holders displaceable in the supports along respective holder axes extending radially of the axis and having respective centering elements engaging the workpiece radially of the main axis;

respective biasing means braced between the holders and the supports for elastically pressing the elements against the workpiece radially of the main axis;

respective brake elements in the supports engageable radially of the holder axes against the holders; and means for pressing the brake elements radially of the holder axes against the holders and thereby damping vibration in the workpiece.

2. The peeling-machine upstream guide defined in claim 1 wherein the brake elements are formed as pistons and the means for pressing includes a source of hydraulic pressure operable against the pistons.

3. The peeling-machine upstream guide defined in claim 2 wherein the hydraulic-pressure source applies the same pressure to all of the pistons.

4. The peeling-machine upstream guide defined in claim 2 wherein the pistons are of a wear-resistant material.

5. The peeling-machine upstream guide defined in claim 4 wherein the pistons are of bronze or red brass.

6. The peeling-machine upstream guide defined in claim 1 wherein the biasing means includes respective springs braced axially of the holder axes against the holders.

* * * * *